Jan. 11, 1944. J. J. ESPOSITO 2,338,913
WELDING ELECTRODE HOLDER
Filed Feb. 10, 1943
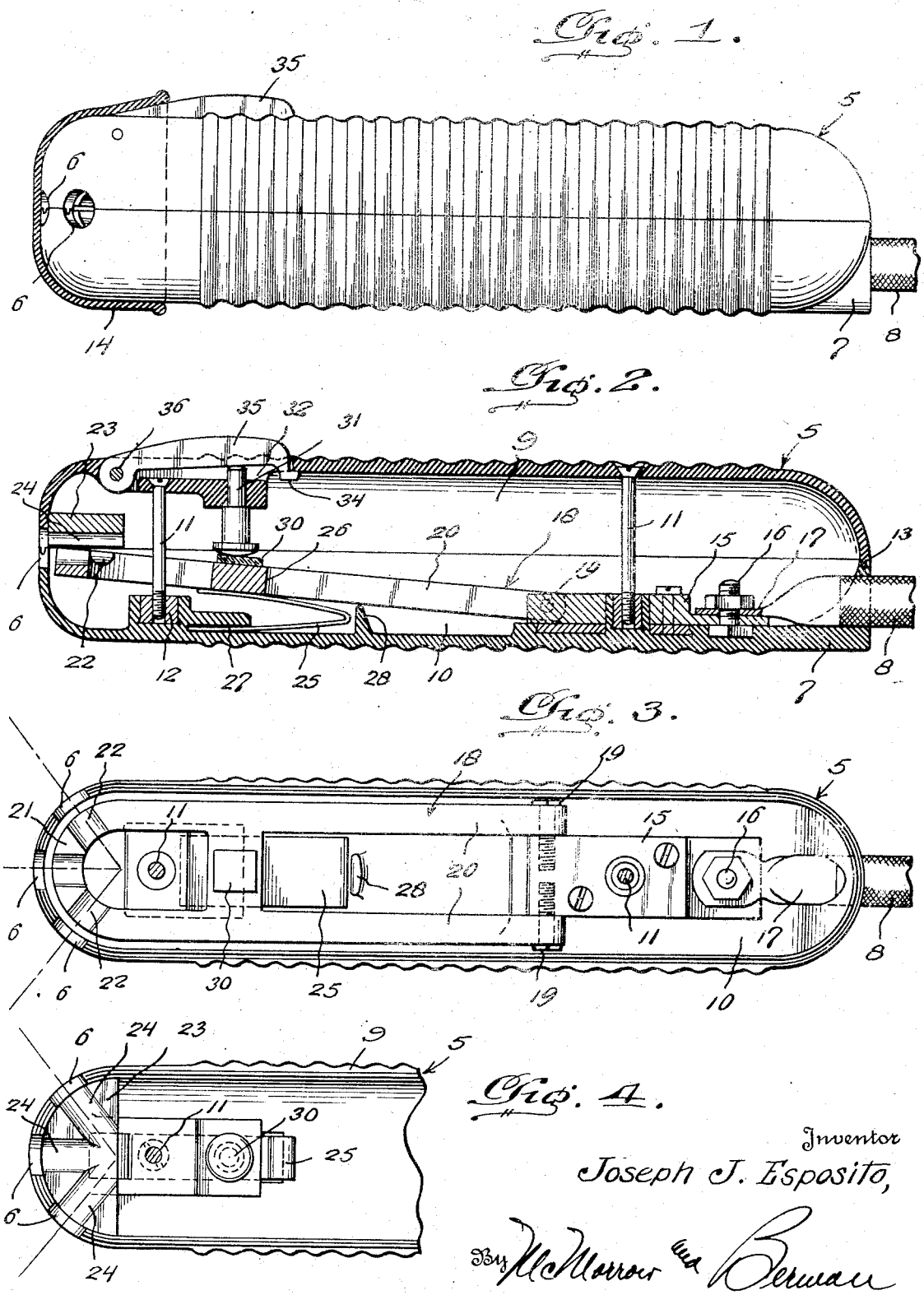
Inventor
Joseph J. Esposito,
By McMorrow and Berman
Attorneys Patented Jan. 11, 1944

2,338,913

UNITED STATES PATENT OFFICE 2,338,913

WELDING ELECTRODE HOLDER

Joseph John Esposito, Washington, D. C.

Application February 10, 1943, Serial No. 475,406

4 Claims. (Cl. 219—8)

This invention relates to a welding electrode holder of the type used by electric welders as a handle by which a welding rod or electrode may be safely handled and also as a means for detachably connecting an electric feed cable to the welding rod.

The primary object of the invention is the provision of a device of the above stated character, which will permit the welder to handle the welding rod with complete safety against electric shocks and burns and is compact to permit convenient handling of the rod, so that welding operations may be carried out in small spaces with the rod adjustable to various angles relative thereto and easily applicable and removable therefrom.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a side elevation, partly in section, illustrating a welding electrode holder constructed in accordance with my invention.

Figure 2 is a vertical sectional view illustrating the device.

Figure 3 is a plan view partly in section illustrating one of the sections of the hand grip and the movable jaw carried thereby and its connection with an electric feed cable.

Figure 4 is a fragmentary plan view of the other section of the hand grip and showing the relatively fixed jaw carried thereby.

Referring in detail to the drawing, the numeral 5 indicates a hand grip constructed of electric insulating material and has a portion of its surface ribbed or otherwise roughened to permit a firm grip to be obtained thereon. The hand grip 5 is substantially cylindrical shaped with both ends substantially closed and rounded to facilitate the convenient handling of a welding rod or electrode in a welding operation.

The hand grip 5 at its rod or electrode-carrying end is provided with a plurality of openings 6, any one of which may receive an electrode or rod to permit one end thereof to be firmly gripped within the hand grip by means which will be hereinafter more fully described, and also to permit the rod or electrode to be arranged at different angles with respect to the hand grip 5.

The other end of the hand grip is thickened and flattened, as shown at 7, and is drilled to permit an electric feed cable 8 to enter the hand grip with a tight frictional fit.

The hand grip 5 is of hollow formation and composed of sections 9 and 10, the sections extending longitudinally of the hand grip and detachably connected by tie bolts 11, the heads of which are countersunk in one of the sections and thread into nuts or similar fasteners 12 anchored in the walls of the other section.

A tongue and groove connection 13 is provided between the sections 9 and 10 to act as a seal between said sections to prevent the entrance of moisture and the openings 6 when the device is not in use may be closed by a cap 14 frictionally fitted over one end of the hand grip so that should the hand grip be laid aside when not in use in contact with water or the like, it will be prevented from entering the hand grip and affecting any of the parts located therein.

Mounted within the section 10 of the hand grip is a terminal plate 15 having a binding post 16 to which the terminal 17 of the electric feed cable is detachably connected. A movable jaw 18 is pivotally connected to the terminal plate 15, as shown at 19. The movable jaw 18 is of substantially U shape providing leg portions 20 and a bight or connecting portion 21. The portion 21 operates within one end of the hand grip and is provided with radially arranged grooves 22 to align with the openings 6 so that the electrode or rod entering an opening 6 may rest within the groove 22 aligning with the opening. A relatively fixed jaw 23 is secured in the section 9 of the hand grip and is provided with radially arranged grooves 24 matching the grooves 22. The jaws 18 and 23 coact in firmly gripping the welding rod or electrode. The movable jaw 18 is moved toward the relatively fixed jaw 23 by a bowed leaf-type spring 25. One end of the spring 25 bears against a plate 26 connecting the leg portions 20 of the movable jaw and the other end of the spring is received within a socket 27 formed in the section 10 of the hand grip. A stop 28 is formed on the section 10 to prevent the movement of the spring 25 out of the socket 27 accidentally but which will permit the spring to be manually removed on the flexation of the spring when desired.

The plate 26 carries an insulating member 30 engaged by a slidable plunger 31. The plunger 31 is slidably mounted in the section 9 of the hand grip with one end enlarged to engage the insulating member 30 and the other end extending into a pocket 32 formed in the exterior of the section 9 of the hand grip. One wall of the pocket 32 has an opening to permit the hook-shaped end 34 of a trigger 35 to enter the section 9 of the hand grip. The trigger 35 operates within the pocket 32 and is pivotally mounted therein by a removable pin 36. The trigger protrudes a limited distance outwardly of the pocket so that it can be conveniently engaged by the operator.

The location of the trigger 35 is such that when the operator grips the device the thumb of the hand may be readily brought into engagement with the trigger for moving the jaw 18 away from the jaw 23 to free the electrode or rod gripped by said jaws or to permit another electrode or rod to be quickly and conveniently applied to the device.

Thus it will be seen that the hand grip 5 is so constructed as to provide a maximum amount of safety to the welder or operator against electric shocks or burns and will permit the rod or electrode to be conveniently handled for welding operations carried on within comparatively small spaces. Further, it will be seen that moisture will be substantially excluded from the interior of the hand grip and thus eliminate any possibility of the electrical parts confined within the hand grip from corroding or otherwise becoming affected so as to prevent proper electrical connection between the electrode or rod and the electric feed cable. The construction of the hand grip will permit any of the parts to be easily renewed when necessary due to the convenient manner in which the sections of the hand grip can be separated.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a welding electrode holder, a hollow elongated hand grip of electric insulating material provided at one end with openings arranged angularly to each other, any one of which to receive a welding rod and the other end of said grip having an opening to receive an electric feed cable with a frictional fit, a relatively fixed jaw mounted in said grip and provided with radially arranged grooves aligning with the first-named openings, a spring influenced movable jaw in said grip and having radially arranged grooves matching the grooves of the fixed jaw, said grooves of the jaws coacting to receive and grip the welding rod, an operating means for the movable jaw, and means for electrically connecting the movable jaw to the electric feed cable.

2. In a welding electrode holder, a cylindrical shaped hollow hand grip having a roughened exterior surface and provided with rounded end walls, one of which is provided with welding rod receiving openings and the other having an opening to receive an electric feed cable, said grip consisting of sections extending longitudinally thereof and having tongue and groove connection with each other, means for detachably connecting the sections of the grip, a relatively fixed jaw secured in one of the sections, a substantially U-shaped movable jaw located in the other section and coactive with the fixed jaw in gripping the rod, a terminal plate secured in one of the sections and pivotally connected to the movable jaw and having the feed cable detachably connected thereto, and an operating means for the movable jaw.

3. In a welding electrode holder, a cylindrical shaped hollow hand grip having a roughened exterior surface and provided with rounded end walls, one of which is provided with welding rod receiving openings and the other having an opening to receive an electric feed cable, said grip consisting of sections extending longitudinally thereof and having tongue and groove connection with each other, means for detachably connecting the sections of the grip, a relatively fixed jaw secured in one of the sections, a substantially U-shaped movable jaw located in the other section and coacting with the fixed jaw in gripping the rod, a terminal plate secured in one of the sections and pivotally connected to the movable jaw and having the electric feed cable detachably connected thereto, a spring mounted in one of the sections and bearing against the movable jaw to urge the latter toward the relatively fixed jaw, a plunger slidably mounted in the other section of the grip and insulated from the movable jaw, and a trigger carried by the last mentioned section for actuating the plunger to effect movement of the movable jaw against the action of the spring.

4. In a welding electrode holder, a cylindrical shaped hollow hand grip having a roughened exterior surface and provided with rounded end walls, one of which is provided with welding rod receiving openings and the other having an opening to receive an electric feed cable, said grip consisting of sections extending longitudinally thereof and having tongue and groove fit with each other, means for detachably connecting the sections of the grip, a relatively fixed jaw secured in one of the sections, a substantially U-shaped movable jaw located in the other section and coacting with the fixed jaw in gripping the rod, a terminal plate secured in one of the sections and pivotally connected to the movable jaw and having the feed cable detachably connected thereto, a spring mounted in one of the sections and bearing against the movable jaw to urge the latter toward the relatively fixed jaw, a plunger slidably mounted in the other section of the grip and insulated from the movable jaw, and a trigger detachably and pivotally mounted in the other section and engageable with the plunger for effecting movement of the movable jaw against the action of the spring, said last-named section having a pocket to partially receive the trigger and an opening to receive the free end of said trigger, said free end of the trigger being hook shaped and extensible through the opening in the latter-named section.

JOSEPH JOHN ESPOSITO.